United States Patent [19]

Shelton et al.

[11] Patent Number: 5,265,904
[45] Date of Patent: Nov. 30, 1993

[54] AIRBAG COVER WITH INTEGRAL HORN SWITCH

[75] Inventors: Darryl A. Shelton, Edgewater, N.J.; Kenneth A. Freeman, Plymouth, Mich.

[73] Assignee: Ford Motor Company, Dearborn, Mich.

[21] Appl. No.: 1,593

[22] Filed: Jan. 7, 1993

[51] Int. Cl.⁵ .............................................. B60R 21/16
[52] U.S. Cl. .................................. 280/731; 200/61.54
[58] Field of Search .................... 280/731, 728, 743; 200/61.54, 61.55

[56] References Cited

U.S. PATENT DOCUMENTS

| | | |
|---|---|---|
| 2,181,728 | 11/1939 | Greentree . |
| 3,699,294 | 10/1972 | Sudduth . |
| 3,819,205 | 6/1974 | Dunford et al. . |
| 3,945,665 | 3/1976 | Tsutsumi et al. . |
| 4,080,519 | 3/1978 | Michalson . |
| 4,228,115 | 10/1980 | Gardner et al. . |
| 4,325,568 | 4/1982 | Clark et al. . |
| 4,374,310 | 2/1983 | Kato et al. . |
| 4,575,117 | 3/1986 | Uchida . |
| 4,594,484 | 6/1986 | Lemmer et al. . |
| 4,602,135 | 7/1986 | Phalen . |
| 4,612,425 | 9/1986 | Kanai et al. . |
| 4,714,806 | 12/1987 | Inui et al. . |
| 4,771,147 | 9/1988 | Buma . |
| 4,785,144 | 11/1988 | Fosnaugh et al. . |
| 4,789,763 | 12/1988 | Nagata et al. . |
| 4,804,857 | 2/1989 | Hayashi et al. . |
| 4,882,460 | 11/1989 | Mertens . |
| 4,934,735 | 6/1990 | Embach . |
| 5,036,169 | 7/1991 | Sakane . |
| 5,085,462 | 2/1992 | Gualtier ......................... 280/731 |
| 5,198,629 | 3/1993 | Hayashi et al. ............ 280/731 X |

*Primary Examiner*—Joseph D. Pape
*Attorney, Agent, or Firm*—Daniel M. Stock; Roger L. May

[57] ABSTRACT

An airbag cover with integral horn switch has an outer cover with positive and negative horn contacts interdigitally disposed and an inner cover whose external surface is a conductive layer. When a force is applied to the outer cover, the conductive layer of the inner cover becomes electrically connected to the positive and negative leads on the outer cover activating the horn.

7 Claims, 2 Drawing Sheets

AIRBAG COVER WITH INTEGRAL HORN SWITCH

BACKGROUND OF THE INVENTION

The present invention relates generally to an airbag assembly or module housed in the center of an automobile steering wheel of an automobile, and more specifically, to the incorporation of a horn into the cover of such a module.

Traditionally, automobile horns have been located primarily in the center of the steering wheel, however the most effective location for an airbag is also in the center of the steering wheel. As a result, horn switches were moved to the spokes of the steering wheel. It is deemed to be desirable to have both the horn switch and airbag module in the center of the steering wheel. One example in which the horn and airbag were both in the center of the steering wheel is shown by U.S. Pat. No. 4,785,144 which describes an inflatable restraint module which when depressed, closes a switch behind the restraint module. The apparatus allows easy serviceability of the inflatable restraint module, but if the horn switch needs servicing, the steering wheel must be removed. In other examples the airbag module and horn switch are one unit. These modules are time consuming and costly to service because if the inexpensive horn switch needs servicing, the entire expensive airbag module must be replaced.

It would be desirable to incorporate the horn into the center of the steering wheel without interfering with the deployment of the airbag. It would also be desirable to have a horn switch which includes movable parts easily removable for servicing and replacing.

SUMMARY OF THE INVENTION

The present invention overcomes the drawbacks of the prior art by placing the horn switch in the airbag cover in such a manner as not to interfere with the deployment of the airbag. A preferred embodiment of the present invention includes a conductive inner cover covering the airbag and an outer cover covering the inner cover. A contact is placed adjacent to but not touching the inner cover and adjacent to the outer cover. A means for spacing the contact from the inner cover is employed to prevent the electrical connection of the first contact with the inner cover except upon the application of sufficient force to the external surface of the outer airbag.

The conductive inner cover and the outer cover are the positive and negative contacts of the horn. In operation when the outer airbag cover is pushed inward, the contacts are electrically connected causing the horn to sound. The outer airbag cover is made of resilient material so when pressure is removed from the outer airbag cover, the outer cover returns to its original position away from the inner airbag surface and the horn becomes disengaged.

DETAILED DESCRIPTION OF THE INVENTION

Figure 1:
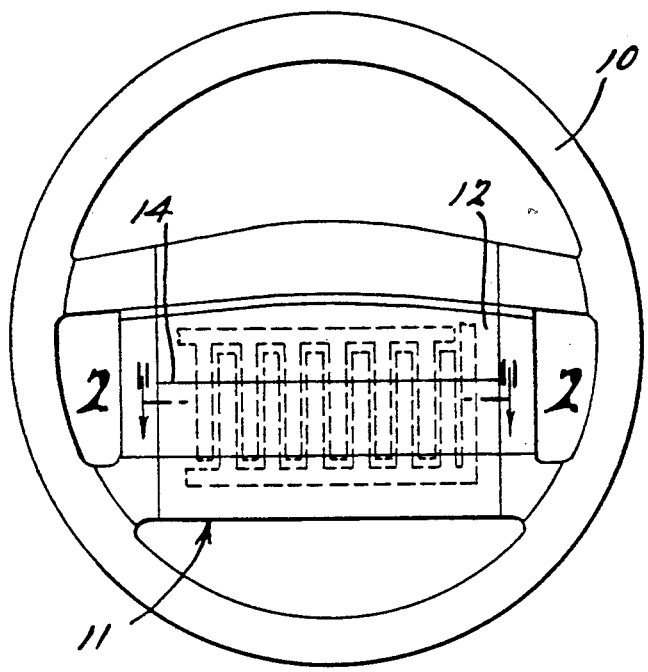
FIG. 1 is a front view of a steering wheel with an airbag cover with integral horn.
Figure 2:
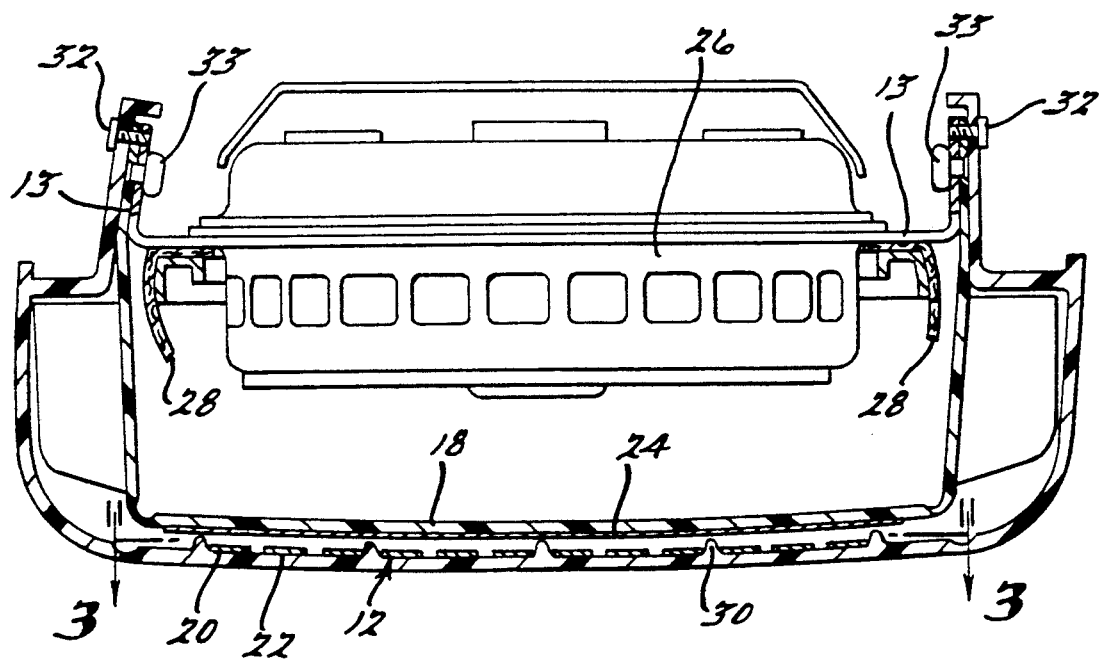
FIG. 2 is a cross sectional view taken along line 2—2 of FIG. 1.

Referring now to FIGS. 1 and 2, a steering wheel assembly has a steering wheel 10 and an airbag assembly 11. Airbag assembly 11 includes an outer cover 12 having a deployment seam 14 on its surface which opens to allow deployment of the enclosed airbag (partially shown at 28). A positive horn switch contact 20, a negative horn switch contact 22 are housed between an inner cover 18 and outer cover 12. Airbag 28 and an airbag inflator 26 are housed behind inner cover 18.

Figure 3:
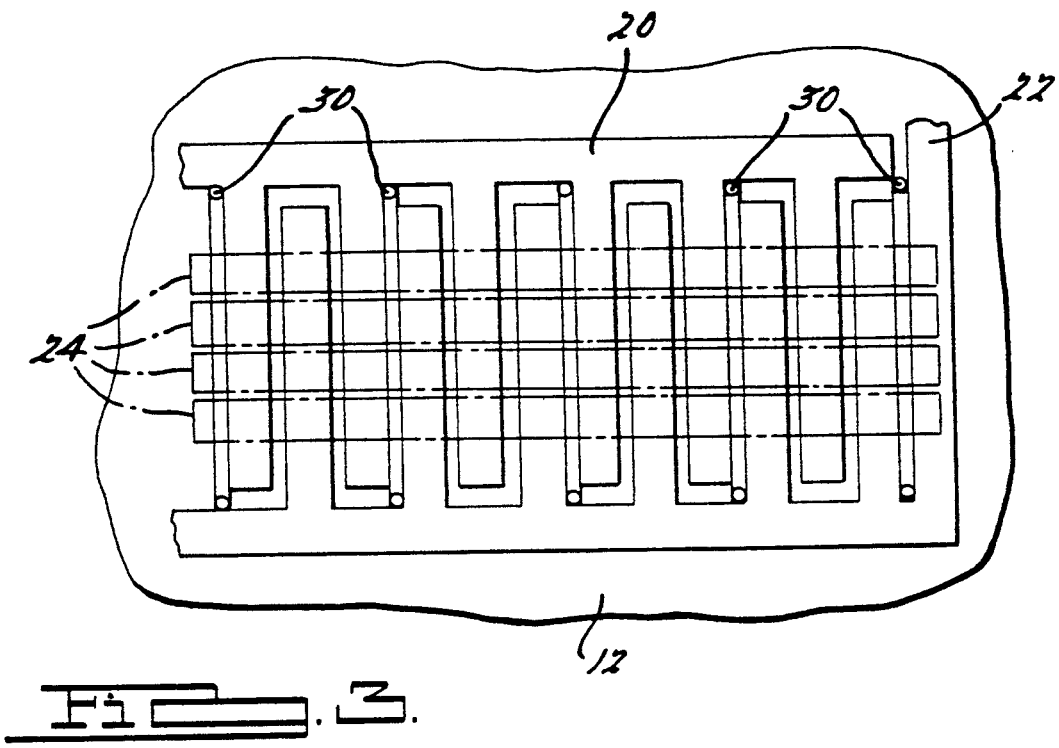
FIG. 3 is a front view of the electrical contacts with the outer cover removed.

Referring now to FIG. 2, airbag 28 and airbag inflator 26 are enclosed by the inner cover 18. Inner cover 18 is preferably thin plastic coated with a conductive layer 24 which can take a variety of shapes, for example, as a series of adjacent conductive strips as shown in FIG. 3 or as a solid rectangular sheet. Inner cover 18 can also be made solely of a thin conductive material, such as a foil, to eliminate the need for a layered material. Inner cover 18 is preferably attached to the airbag module back plate 13 by permanent attachment means such as a rivet 33.

Outer cover 12 is detachably mounted in a spaced relationship to inner cover 18 by a conventional releasable fastening means such a screw 32 so that a cavity is formed between it and inner cover 18. Outer cover 12 is made of a resilient material, for instance a plastic such as DuPont DYM 100, so that it will return to its original shape after applied force is removed.

The horn switch contacts are housed in the cavity between inner cover 18 and outer cover 12. The horn switch is comprised of alternating strips of a positive horn contact 20 and negative horn contacts 22 which are located on the inner surface of outer cover 12. When positive contact 20 and negative contact 22 are electrically connected (e.g., through conductive layer 24), power is provided to the horn to enable it to sound. The contacts 20, 22 are made of a thin conductive film or foil material so deployment of airbag 28 is not hindered.

In operation, spacers 30 prevent conductive layer 24 from unintentionally contacting positive contact 20 or negative contact 22. Spacers 30 are preferably made of nonconducting material molded into interior surface of outer cover 12 to prevent shorting of the charged contacts.

FIG. 3 shows one of many possible contact configurations. Positive contact 20 and negative contact 22 are interdigitally disposed on the inner surface of outer cover 12. The fingers of positive contact 20 and negative contact 22 are alternately placed parallel but not touching each other.

Figure 4:
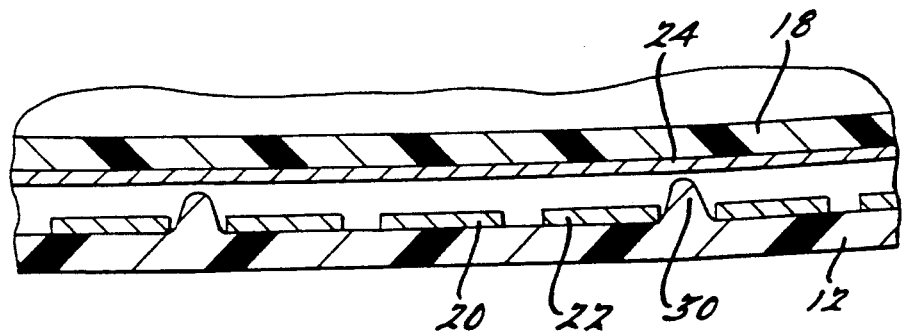
FIG. 4 is an enlarged cross sectional view taken along line 2—2 of FIG. 1 when the horn is disengaged.

FIG. 4 shows an enlarged portion of the cross section in which the horn switch is disengaged. Spacer 30 is integrated into outer cover 12 and separates conductive layer 24 of inner cover 18 from positive contact 20 and negative contact 22.

Figure 5:
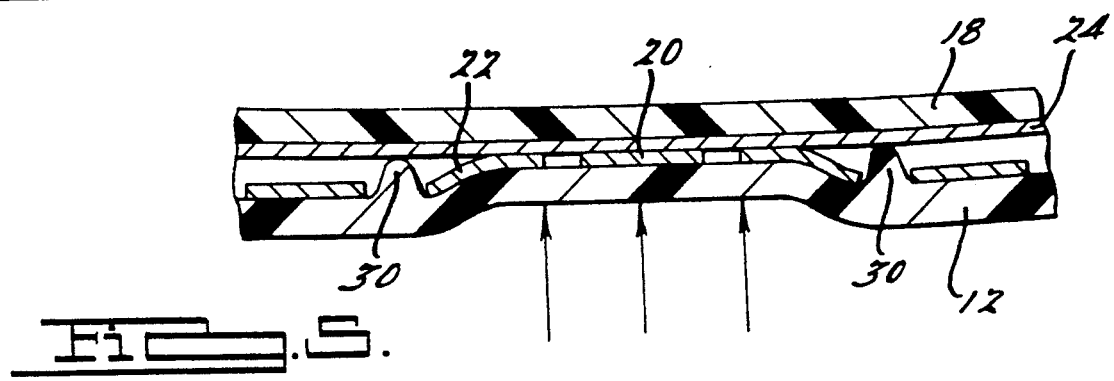
FIG. 5 is an enlarged cross sectional view taken along line 2—2 of FIG. 1 when the horn is engaged.

FIG. 5 shows an enlarged cross section in which the horn switch is engaged. Outer cover 12 has sufficient force applied to deform outer cover 12 toward inner cover 18 so that positive contact 20 and negative contact 22 are electrically connected through conductive layer 24. When positive contact 20 and negative contact 22 become electrically connected, the horn is engaged. Outer cover 12 is made of a resilient material so that the cover will return to its original position as in FIG. 4 when pressure is withdrawn from its surface.

Because the deployment of the airbag is so forceful, the airbag will break through inner cover 18 and deployment seam 14 of outer cover 12 unhindered. Also positive contacts 20 and negative contacts 22 are made of material so that they also will not hinder the deployment of airbag 28, such as an aluminum foil. The foil can also be perforated to weaken the foil when the airbag deploys.

As an alternative, the contacts on outer airbag cover 12 may be the same polarity. Conductive layer 24 would then be the opposite polarity as the contacts on outer airbag cover 12. The operation of the switch would otherwise be the same.

Another alternative would be to place the horn switch on either side of the deployment seam 14 so that the airbag would not be deployed through the horn switch.

What is claimed is:

1. An airbag assembly with integral horn switch comprising:
    an airbag;
    an airbag inflator;
    an inner cover housing said airbag between said airbag inflator and said inner cover;
    an outer cover covering said inner cover;
    a first contact located in a first plane adjacent to said outer cover between said outer cover and said inner cover;
    a second contact located in said first plane and laterally spaced from said first contact adjacent;
    a third contact located in a second plane adjacent to said inner cover so that said third contact is positioned between said first plane and said inner cover; and
    means for spacing said first and second contacts from said third contact to prevent an electrical connection of said first and second contact through said third contact except upon an application of force to the external outer surface of said outer cover.

2. The airbag assembly as in claim 1 wherein said outer cover is demountably attached to the airbag inflator.

3. The airbag assembly as in claim 1 wherein said spacing means is formed integrally with said outer airbag cover.

4. The airbag assembly as in claim 1 wherein said first and second contacts comprise a plurality of conductive fingers interdigitally disposed on the surface of said outer cover.

5. The airbag assembly as in claim 4 wherein said second contact has an opposite polarity than said first contact.

6. The airbag assembly as in claim 1 wherein inner cover is formed of metallic foil to define said third contact.

7. The airbag assembly as in claim 1 wherein said third contact is formed on said inner cover by a series of electrically connected conductive strips.

* * * * *